(12) United States Patent
Russell et al.

(10) Patent No.: US 9,153,017 B1
(45) Date of Patent: Oct. 6, 2015

(54) SYSTEM AND METHOD FOR OPTIMIZED CHROMA SUBSAMPLING

(71) Applicant: Google Inc., Mountain View, CA (US)

(72) Inventors: Andrew Ian Russell, San Jose, CA (US); Pascal Massimino, Île-de-France (FR)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/460,392

(22) Filed: Aug. 15, 2014

(51) Int. Cl.
  *G06K 9/00* (2006.01)
  *G06T 5/50* (2006.01)
  *G06T 5/00* (2006.01)
  *G06T 7/40* (2006.01)

(52) U.S. Cl.
  CPC . *G06T 5/50* (2013.01); *G06T 5/002* (2013.01); *G06T 7/408* (2013.01); *G06T 2207/10024* (2013.01); *G06T 2207/20182* (2013.01); *G06T 2207/30168* (2013.01)

(58) Field of Classification Search
  USPC ......... 382/162, 167, 218, 219, 103, 118, 239; 348/223.1, 252, 341; 358/1.9, 3.23, 358/3.26, 518; 375/240.13
  See application file for complete search history.

(56) References Cited

U.S. PATENT DOCUMENTS

| | | | |
|---|---|---|---|
| 4,924,310 A | 5/1990 | von Brandt | |
| 5,148,269 A | 9/1992 | de Haan et al. | |
| 5,337,086 A | 8/1994 | Fujinami | |
| 5,398,068 A | 3/1995 | Liu et al. | |
| 5,512,952 A | 4/1996 | Iwamura | |
| 5,701,160 A | 12/1997 | Kimura et al. | |
| 5,731,840 A | 3/1998 | Kikuchi et al. | |
| 5,886,742 A | 3/1999 | Hibi et al. | |
| 5,929,919 A | 7/1999 | De Haan et al. | |
| 5,991,447 A | 11/1999 | Eifrig et al. | |
| 6,005,980 A | 12/1999 | Eifrig et al. | |
| 6,058,141 A | 5/2000 | Barger et al. | |
| 6,272,179 B1 | 8/2001 | Kadono | |
| 6,289,049 B1 | 9/2001 | Kim et al. | |
| 6,359,929 B1 | 3/2002 | Boon | |
| 6,381,277 B1 | 4/2002 | Chun et al. | |
| 6,385,245 B1 | 5/2002 | De Haan et al. | |

(Continued)

FOREIGN PATENT DOCUMENTS

| EP | 0634873 | 1/1995 |
|---|---|---|
| EP | 1876823 | 1/2008 |

OTHER PUBLICATIONS

Bankoski et al. "Technical Overview of VP8, An Open Source Video Codec for the Web". Dated Jul. 11, 2011.

(Continued)

*Primary Examiner* — Anh Do
(74) *Attorney, Agent, or Firm* — Young Basile Hanlon & MacFarlane P.C.

(57) ABSTRACT

A method includes obtaining, at one or more computing devices, an input image; determining a first value of a quality metric for the input image; generating a first chroma subsampled representation of the input image; and generating a reconstructed image based on the chroma subsampled representation. The method also includes determining a second value of the quality metric for the reconstructed image; determining an error value based on the first value of the quality metric and the second value of the quality metric; and generating a second chroma subsampled representation of the input image based in part on the error value.

21 Claims, 3 Drawing Sheets

(56) References Cited

U.S. PATENT DOCUMENTS

| | | | |
|---|---|---|---|
| 6,449,312 | B1 | 9/2002 | Zhang et al. |
| 6,711,211 | B1 | 3/2004 | Lainema |
| 6,735,249 | B1 | 5/2004 | Karczewicz et al. |
| 6,839,386 | B2 | 1/2005 | Sato et al. |
| 6,927,804 | B2 | 8/2005 | Adams, Jr. et al. |
| 7,003,174 | B2 | 2/2006 | Kryukov et al. |
| 7,054,367 | B2 | 5/2006 | Oguz et al. |
| 7,084,906 | B2 | 8/2006 | Adams, Jr. et al. |
| 7,133,070 | B2 * | 11/2006 | Wheeler et al. ............ 348/223.1 |
| 7,158,668 | B2 | 1/2007 | Munsil et al. |
| 7,346,109 | B2 | 3/2008 | Nair et al. |
| 7,474,355 | B2 | 1/2009 | Leone et al. |
| 7,483,577 | B2 | 1/2009 | Xin et al. |
| 7,671,922 | B2 | 3/2010 | Leone et al. |
| 7,724,307 | B2 | 5/2010 | Wan et al. |
| 7,978,770 | B2 | 7/2011 | Luo et al. |
| 8,023,749 | B2 | 9/2011 | Nakayama |
| 8,335,105 | B2 * | 12/2012 | Wang et al. ................. 365/171 |
| 8,422,546 | B2 | 4/2013 | Lin et al. |
| 8,593,692 | B2 * | 11/2013 | Chen et al. .................. 358/3.23 |
| 8,908,984 | B2 * | 12/2014 | Carmel et al. ................ 382/239 |
| 2002/0031272 | A1 | 3/2002 | Bagni et al. |
| 2003/0053708 | A1 | 3/2003 | Kryukov et al. |
| 2003/0086498 | A1 | 5/2003 | Lee et al. |
| 2004/0071313 | A1 | 4/2004 | Hahn et al. |
| 2004/0227758 | A1 | 11/2004 | Curry et al. |
| 2006/0242581 | A1 | 10/2006 | Manion et al. |
| 2007/0076959 | A1 | 4/2007 | Bressan |
| 2007/0292036 | A1 | 12/2007 | Nakayama |
| 2009/0167778 | A1 | 7/2009 | Wei |
| 2010/0053451 | A1 | 3/2010 | Seong et al. |
| 2010/0091194 | A1 | 4/2010 | Lei et al. |
| 2010/0177239 | A1 | 7/2010 | Servais et al. |
| 2010/0283892 | A1 | 11/2010 | Zhou et al. |
| 2010/0289816 | A1 | 11/2010 | Au et al. |
| 2011/0007979 | A1 | 1/2011 | Goma |
| 2011/0069237 | A1 | 3/2011 | Wang et al. |
| 2012/0063681 | A1 | 3/2012 | Sandrew et al. |
| 2012/0154370 | A1 | 6/2012 | Russell et al. |
| 2013/0022119 | A1 | 1/2013 | Chien et al. |
| 2013/0223733 | A1 | 8/2013 | Tripathi et al. |
| 2014/0294320 | A1 | 10/2014 | Kokaram et al. |

OTHER PUBLICATIONS

Bankoski et al. "VP8 Data Format and Decoding Guide" Independent Submission. RFC 6389, Dated Nov. 2011.
Bankoski et al. "VP8 Data Format and Decoding Guide; draft-bankoski-vp8-bitstream-02" Network Working Group. Internet-Draft, May 18, 2011, 288 pp.
Chen, Michael C., et al.; "Design and Optimization of a Differentially Coded Variable Block Size Motion Compensation System", IEEE 1996, 4 pp.
Chen, Xing C., et al.; "Quadtree Based Adaptive Lossy Coding of Motion Vectors", IEEE 1996, 4 pp.
Dalal et al., "Histograms of oriented gradients for human detection", Computer vision and Pattern Recognition, vol. 1, pp. 886-893, Jun. 25, 2005.
Ebrahimi, Touradj, et al.; "Joint motion estimation and segmentation for very low bitrate video coding", SPIE vol. 2501, 1995, 12 pp.
Fang et al., "A New Adaptive Subpixel-based Downsampling Scheme Using Edge Detection", pp. 3194-3197, ISCAS, 14-27, 2009.
Guillotel, Philippe, et al.; "Comparison of motion vector coding techniques", SPIE vol. 2308, 1994, 11 pp.
Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
ISR for related application PCT/US2014/032207 mailed Jul. 7, 2014.
Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.
Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.
Krishnamurthy et al. Frame Interpolation and Bidirectional Prediction of Video Using Compactly Encoded Optical-Flow Fields and Label Fields, IEEE Transactions on Circuits and Systems for video Technology, vol. 9, No. 5, Aug. 1, 1999.
Liu, Bede, et al.; "A simple method to segment motion field for video coding", SPIE vol. 1818, Visual Communications and Image Processing 1992, 10 pp.
Liu, Bede, et al.; "New Fast Algorithms for the Estimation of Block Motion Vectors", IEEE Transactions on Circuits and Systems for Video Technology, vol. 3, No. 2, Apr. 1993, 10 pp.
Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.
Martin, Graham R., et al.; "Reduced Entropy Motion Compensation Using Variable Sized Blocks", SPIE vol. 3024, 1997, 10 pp.
Mozilla, "Introduction to Video Coding Part 1: Transform Coding", Video Compression Overview, Mar. 2012, 171 pp.
Nicolas, H., et al.; "Region-based motion estimation using deterministic relaxation schemes for image sequence coding", IEEE 1992, 4 pp.
Nokia, Inc., Nokia Research Center, "MVC Decoder Description", Telecommunication Standardization Sector, Study Period 1997-2000, Geneva, Feb. 7, 2000, 99 pp.
Ojo et al., "Robust Motion-Compensated Video Upconversation" IEEE Transactions on Consumer Electronics, vol. 43, No. 4, Nov. 1, 1997, pp. 1045-1056.
Orchard, Michael T.; "Exploiting Scene Structure in Video Coding", IEEE 1991, 5 pp.
Orchard, Michael T.; "Predictive Motion-Field Segmentation for Image Sequence Coding", IEEE Transactions on Circuits and Systems for Video Technology, vol. 3, No. 1, Feb. 1993, 17 pp.
Overview; VP7 Data Format and Decoder. Version 1.5. On2 Technologies, Inc. Dated Mar. 28, 2005.
Schiller, H., et al.; "Efficient Coding of Side Information in a Low Bitrate Hybrid Image Coder", Signal Processing 19 (1990) Elsevier Science Publishers B.V. 61-73, 13 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

(56) References Cited

OTHER PUBLICATIONS

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

Steliaros, Michael K., et al.; "Locally-accurate motion estimation for object-based video coding", SPIE vol. 3309, 1997, 11 pp.

Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.

Strobach, Peter; "Tree-Structured Scene Adaptive Coder", IEEE Transactions on Communications, vol. 38, No. 4, Apr. 1990, 10 pp.

VP6 Bitstream & Decoder Specification. Version 1.02. On2 Technologies, Inc. Dated Aug. 17, 2006.

VP6 Bitstream & Decoder Specification. Version 1.03. On2 Technologies, Inc. Dated Oct. 29, 2007.

VP8 Data Format and Decoding Guide. WebM Project. Google On2. Dated: Dec. 1, 2010.

Wiegand, Thomas, et al.; "Long-Term Memory Motion-Compensated Prediction", Publication Unknown, Date Unknown, 15 pp.

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

Wright, R. Glenn, et al.; "Multimedia—Electronic Technical Manual for ATE", IEEE 1996, 3 pp.

Zhang, Kui, et al.; "Variable Block Size Video Coding With Motion Prediction and Motion Segmentation", SPIE vol. 2419, 1995, 9 pp.

Wikipedia contributors, 'Chroma subsampling', webpage, last updated Jun. 3, 2014, pp. 1-8, http://en.wikipedia.org/wiki/Chroma_subsampling [accessed Aug. 4, 2014].

* cited by examiner

SYSTEM AND METHOD FOR OPTIMIZED CHROMA SUBSAMPLING

BACKGROUND

Digital images and videos are represented by pixels that have color values. Typically, the color value of each pixel is represented by component values. One way to represent color values is by using an RGB color space where each pixel is represented by individual values for red, green, blue color components that are added together to produce a particular color. Another way to represent color values is by separating luma and chroma information, such as in a YUV color space (e.g. Y'CbCr). This type of color space is commonly used in image compression schemes for both still images and video, in part because it allows for chroma subsampling, which is a common technique for reducing the amount of data that is used to represent images and video.

Some color space conversions cause a loss of spatial resolution (downsampling) and range reduction (clipping) when some values in one color space are not representable in the other.

Chroma subsampling reduces the spatial resolution of color information while retaining the spatial resolution of brightness information. This reduction in color information is often not readily perceived by humans, because the human visual system is more sensitive to brightness than it is to color. There are certain types of images, however, in which chroma subsampling will introduce visually disturbing artifacts, such as in images containing text, striped patterns, checkerboard patterns, computer-rendered graphics, and artificially generated smooth gradients.

SUMMARY

This disclosure relates in general to chroma subsampling.

One aspect of the disclosed embodiments is a method that includes obtaining, at one or more computing devices, an input image; determining a first value of a quality metric for the input image; generating a first chroma subsampled representation of the input image; and generating a reconstructed image based on the chroma subsampled representation. The method also includes determining a second value of the quality metric for the reconstructed image; determining an error value based on the first value of the quality metric and the second value of the quality metric; and generating a second chroma subsampled representation of the input image based in part on the error value.

Another aspect of the disclosed embodiments is an apparatus that includes a memory; and a processor configured to execute instructions stored in the memory. The instructions, when executed, cause the processor to obtain an input image, determine a first value of a quality metric for the input image, generate a first chroma subsampled representation of the input image, and generate a reconstructed image based on the chroma subsampled representation. The instructions further cause the processor to determine a second value of the quality metric for the reconstructed image, determine an error value based on the first value of the quality metric and the second value of the quality metric, and generate a second chroma subsampled representation of the input image based in part on the error value.

Another aspect of the disclosed embodiments is a non-transitory computer-readable storage device including program instructions executable by one or more processors that, when executed, cause the one or more processors to perform operations. The operations include obtaining an input image, determining a first value of a quality metric for the input image, generating a first chroma subsampled representation of the input image, and generating a reconstructed image based on the chroma subsampled representation. The operations further include determining a second value of the quality metric for the reconstructed image, determining an error value based on the first value of the quality metric and the second value of the quality metric, and generating a second chroma subsampled representation of the input image based in part on the error value.

BRIEF DESCRIPTION OF THE DRAWINGS

The description herein makes reference to the accompanying drawings wherein like reference numerals refer to like parts throughout the several views, and wherein.

DETAILED DESCRIPTION

The systems and methods described herein are directed to optimizing chroma subsampling. As will be described more fully herein, a quality metric is measured for an input image and a reconstructed image, and those measurements are used to optimize the chroma subsampling in order to reduce visual artifacts in the final image.

Figure 1:
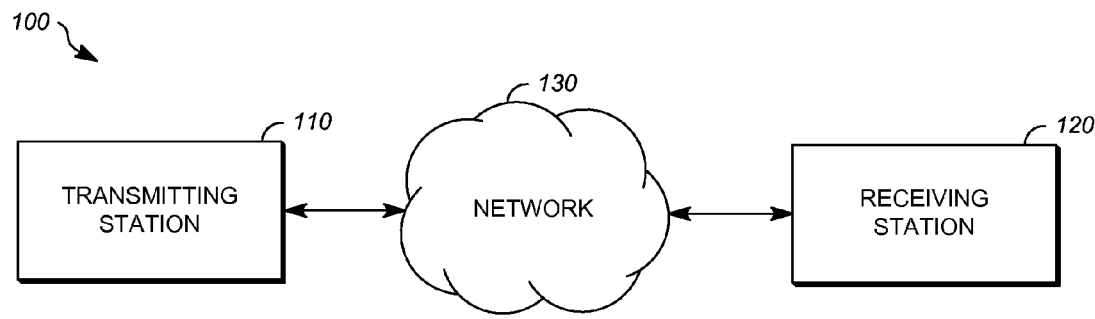
FIG. 1 is a block diagram showing an example of an environment in which a system for optimized chroma subsampling can be implemented.

FIG. 1 is a block diagram showing an example of an environment 100 in which a system for optimizing chroma subsampling can be implemented. The environment 100 includes a transmitting station 110 and a receiving station 120 that are connected by a network 130. The transmitting station 110 and the receiving station 120 can be implemented in many ways, such as in the form of one or more computing devices having a memory and a processor. The network 130 can be or include any or all of the Internet, a local area network (LAN), wide area network (WAN), virtual private network (VPN), cellular telephone network or any other means of transferring information from the transmitting station 110 to the receiving station 120.

The transmitting station 110 is operable to perform an optimized chroma subsampling operation with respect to an image, as will be discussed further herein. The optimized chroma subsampling operation can be performed prior to encoding the image or as part of the encoding process.

Figure 2:
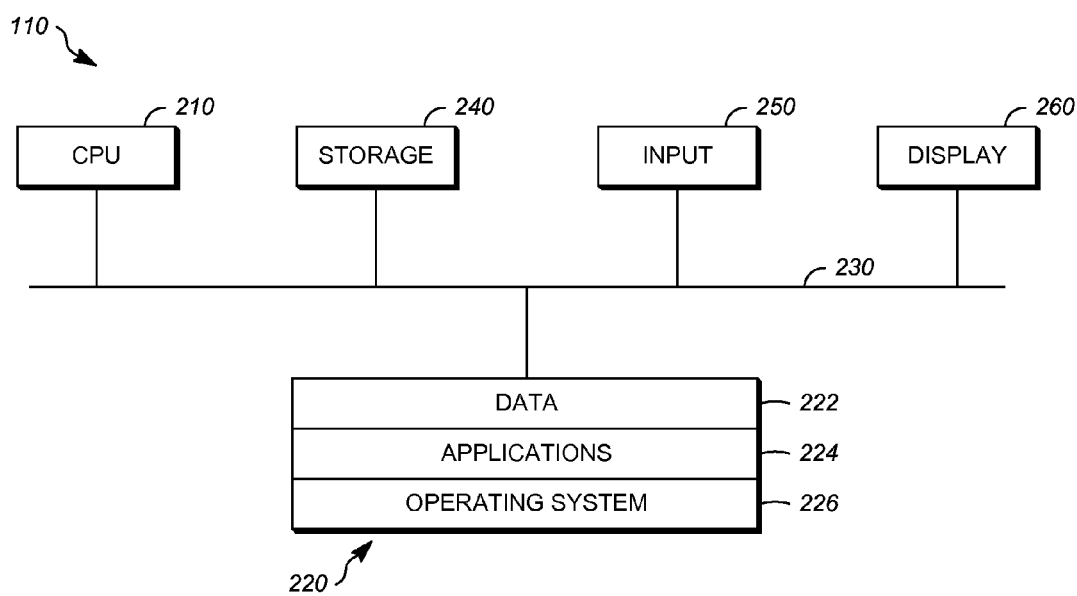
FIG. 2 is a block diagram showing an example of a hardware configuration for a transmitting station.

FIG. 2 is a block diagram of an example of a hardware configuration for the transmitting station 110. The same hardware configuration or a similar hardware configuration can be used to implement the receiving station 120. The transmitting station 110 can include a CPU 210. The CPU 210 can be a conventional central processing unit. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

The transmitting station 110 can include memory 220, such as a random access memory device (RAM). Any other suitable type of storage device can also be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described here.

A storage device 240 can be optionally provided in the form of any suitable computer readable medium, such as a hard disc drive, a memory device, a flash drive, or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as a liquid crystal display (LCD) or a cathode-ray tube (CRT), allows output to be presented to a user, for example, in response to receiving a video signal.

Although FIG. 2 depicts the CPU 210 and the memory 220 of the transmitting station 110 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines. Although depicted here as a single bus, the bus 230 of the transmitting station 110 can be composed of multiple buses. Further, the storage device 240 can be directly coupled to the other components of the transmitting station 110 or can be accessed via a network and can comprise a single integrated unit such as a memory card or multiple units such as multiple memory cards. The transmitting station 110 can thus be implemented in a wide variety of configurations.

Figure 3:
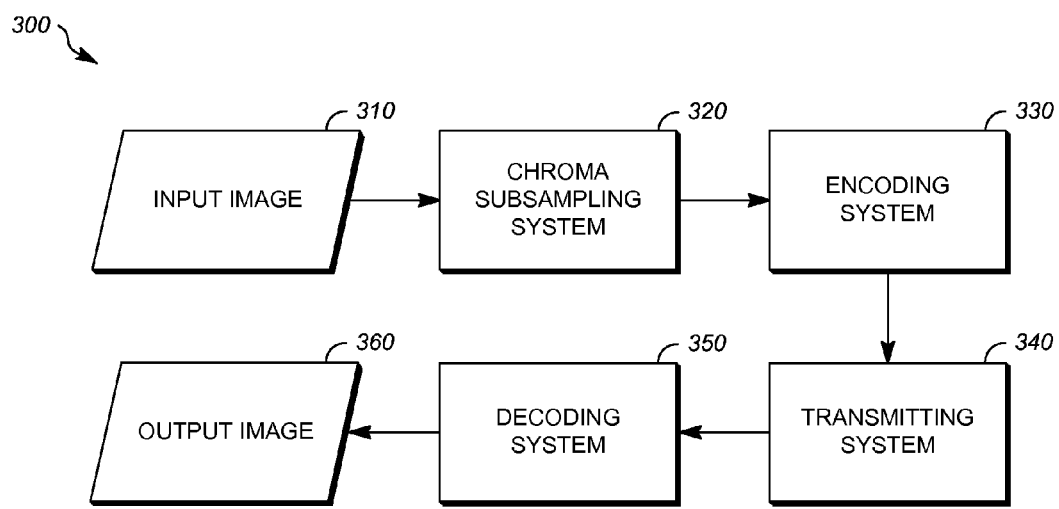
FIG. 3 is an illustration showing an example of an image transmission operation.

FIG. 3 is an illustration showing an example of an image transmission operation 300 in which an input image 310 is processed and an encoded representation of the input image 310 is encoded at a first computing device and then transmitted to a second computing device where it is decoded and output for display. The image transmission operation 300 can be performed, for example, by the transmitting station 110 and the receiving station 120, by execution of computer program instructions at each of the transmitting station 110 and the receiving station 120.

The input image 310 is a digital image that is defined by a plurality of pixels, as is well known in the art. Each pixel has a color value that defines the color of the respective pixel when it is output for display. Each color value can be defined by multiple component values, such as in the RGB color space, which represents pixels as tuples of red, green, and blue component values. Other color spaces can be utilized for the input image 310. In some implementations, the input image can be a still image, such as a compressed or uncompressed bitmap image in any suitable format. In other implementations, the input image can be a video frame or part of a video frame from a video, which can be received, for example, in the form of a video bitstream.

The input image 310 is received as an input at a chroma subsampling system 320. The chroma subsampling system 320 can be implemented, for example, by the transmitting station 110.

The chroma subsampling system 320 is operable to generate a chroma subsampled version of the input image 310. The chroma subsampled version of the input image 310 is in a format that separates luma information and chroma information, so that the spatial resolution of the chroma information can be reduced. In one implementation, the chroma subsampled version of the input image 310 is a YUV image. Without subsampling, the YUV444 image format utilizes 3 bytes per pixel. YUV images that implement subsampling reduce the amount of information needed to represent pixels. As examples, the YUV422 format utilizes 4 bytes per 2 pixels, the YUV411 format utilizes 6 bytes per 4 pixels, and the YUV420 format utilizes 6 bytes per 4 pixels.

During chroma subsampling, such as at the chroma subsampling system 320, some of the color information from the original image is discarded. In most formats, a chroma subsampled image will include a luma value (e.g. Y') for each pixel, but for each chroma component value (e.g. U and V), there will be less values than there are pixels. For example, in the YUV420 image format, each U value and each V value corresponds to four pixels that form a two pixel by two pixel square in the original image. As a result, when an image, such as an RGB image, is converted to a chroma subsampled format, such as YUV format, and subsequently reconstructed by converting the chroma subsampled image back to the original format, many of the pixel values in the reconstructed RGB image will be different than those in the original image.

In order to reduce visual artifacts that can be introduced as a result of chroma subsampling, the chroma subsampling system 320 implements an optimization process. In the optimization process, the input image 310 a first value for a quality metric is measured with respect to the input image, with the input image being in a format that is not chroma subsampled and includes full resolution chroma information (referred to herein as a "non-chroma subsampled format"). The input image is then converted to a chroma subsampled format as a first chroma subsampled representation of the input image. The first chroma subsampled representation of the input image is converted back to the non-chroma subsampled format as a reconstructed image, and a second value for the quality metric is measured with respect to this reconstructed image. An error value is computed based on the first and second values for the quality metric. The values for the quality metric and the error value can be computed on a per-pixel basis. The error value is then utilized to generate a second chroma subsampled representation of the input image by modifying the first chroma subsampled representation of the input image based on the error value. Further iterations of calculating the reconstructed image, the additional values for the quality metric and error value are performed until a condition is met. Meeting the condition signifies the end of the process, with the current chroma subsampled representation being utilized as the chroma subsampled version of the input image 310 that is produced as the output of the chroma subsampling subsystem. As examples, the condition can be the error values falling below a threshold value and/or performance of a certain number of iterations.

The chroma subsampled version of the input image 310 is received as an input at an encoding system 330. The encoding system 330 can be implemented, for example, by the transmitting station 110.

The encoding system 330 is operable to compress the chroma subsampled version of the input image. There are many well-known still image and video encoding formats that can be implemented by the encoding system. It is also expected that the methods and systems described herein will be used in conjunction with subsequently developed still image and video encoding schemes. Because potential artifacts due to chroma subsampling are addressed at the chroma subsampling system 320 and the chroma subsampled version of the input image 310 is provided to the encoding system in a standard format, the optimization described herein can be implemented without otherwise modifying the encoding process. Thus, the encoding system 330 can be conventional in nature. In some implementations, however, the chroma subsampling system 320 can be incorporated in the encoding process that is performed by the encoding system 330, but the combined systems can operate in the same manner as separate systems.

The output of the encoding system 330 is an encoded version of the input image 310. The encoded version of the input image 310 can be stored, such as at the transmitting station 110, for later use and/or transmission.

The transmission system 340 is operable to obtain the encoded version of the input image 310 and transmit it to a remote computing device. The transmission system 340 can be implemented, for example, by the transmitting station 110 sending the encoded version of the input image 310 to the receiving station 120. The transmission can be made in any suitable manner, for example, via the network 130. It should be noted that transmission of the encoded version of the input image 310 can occur multiple times, such as by a multicast transmission to multiple endpoints or by repeated transmissions over a prolonged period of time to any number of endpoints.

The transmission of the encoded version of the input image 310 is received as an input at a decoding system 350. The decoding system 350 can be implemented, for example, by the receiving station 120.

The decoding system 350 is operable to decompress the encoded version of the input image 310. The decoding system 350 employs a decoding method that corresponds to the format in which the encoded version of the input image 310 is encoded, with the operations of the decoding process being the inverse of those in the encoding system 330. As with the encoding system 330, the decoding system 350 is conventional in nature and need not be modified to accommodate the optimizations performed by the chroma subsampling system 320. The output of the decoding system 350 is a decoded and chroma subsampled output image 360, which can be output for display, as at a display device associated with the receiving station 120.

Figure 4:
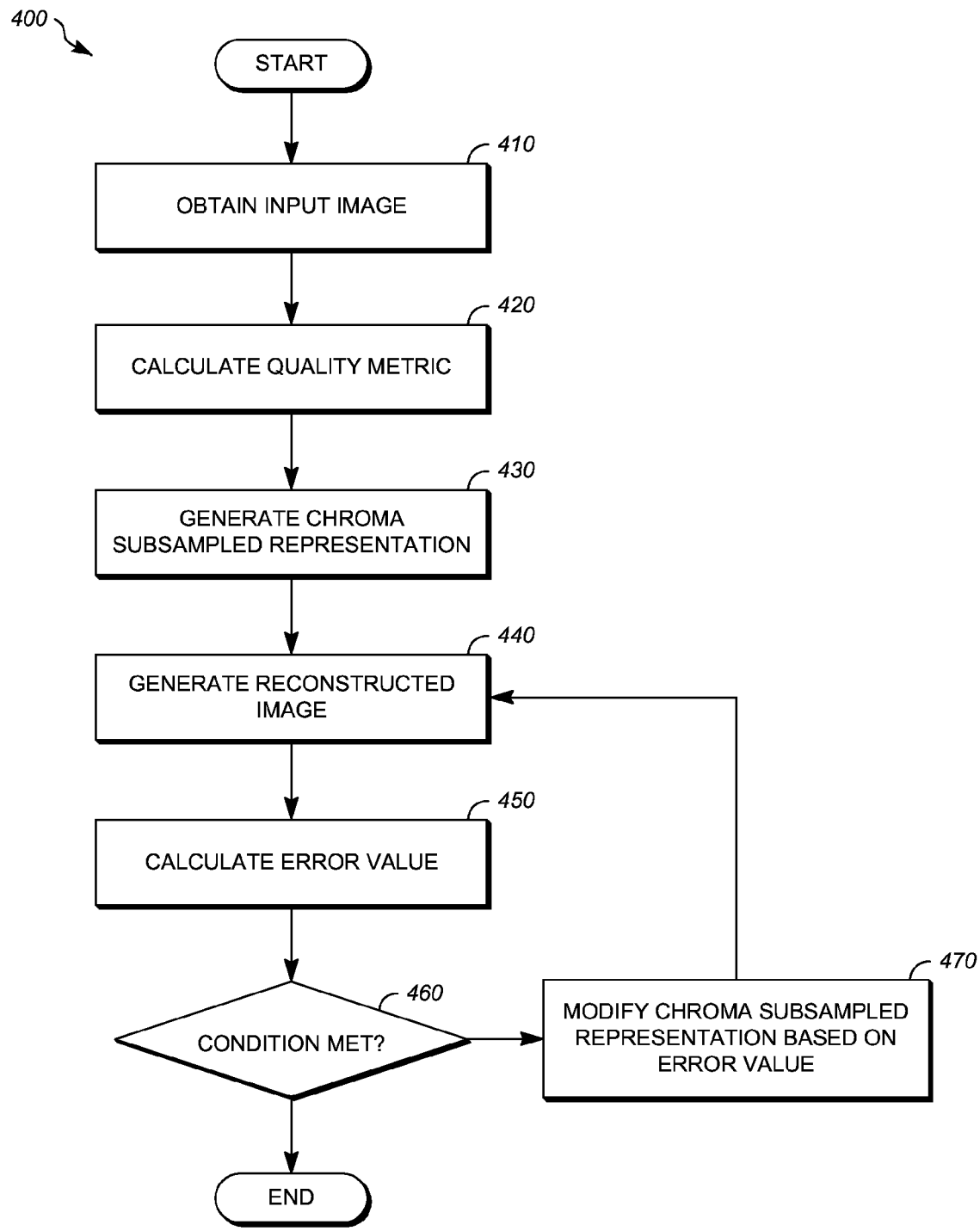
FIG. 4 is a flowchart showing an example process for optimized chroma subsampling.

FIG. 4 is a flowchart showing a first example of a process 400 for optimized chroma subsampling of images that can be implemented by the chroma subsampling system 320 in the image transmission operation 300. The process 400 can also be employed in contexts other than the image transmission operation 300. The operations described in connection with the process 400 can be performed at one or more computers, such as at that transmitting station 110. When an operation is described as being performed by one or more computers, it is completed when it is performed by one computer working alone, or by multiple computers working together. The operations described in connection with the process 400 can be embodied as a non-transitory computer readable storage medium including program instructions executable by one or more processors that, when executed, cause the one or more processors to perform the operations. For example, the operations described in connection with the process 400 could be stored at the memory 220 of one of the receiving station 120 and be executable by the CPU 210 thereof.

In operation 410 an input image is obtained, such as the input image 310. The input image can be obtained, for example, by accessing the image from memory, accessing the image from a storage device, or receiving the image via a network transmission such as a transmission from the transmitting station 110 to the receiving station 120 via the network 130. If necessary, the image can be decoded to obtain pixel values for the image.

In operation 420 a quality metric is computed. The quality metric computed at operation 420 is computed based on the pixel values of the input image 310 and is referred to herein as an initial value of the quality metric or a first value of the quality metric. The first value of the quality metric is based on the color component values of each pixel from the input image 310, and can be computed using a function that accepts the color component values of each pixel as inputs. For instance, the quality metric can be calculated as an average, weighted average, or other combination of the color component values for each pixel. The quality metric can be computed and stored for later use on a per pixel basis, with component parts of the quality metric corresponding to Y, U, and V components respectively.

The quality metric can be computed in a manner that models human visual perception. In one example, the quality metric is calculated in linear space in order to model human visual perception.

The Y component of the quality metric can be computed by linear space averaging of the color components of the input image. The input image 310 is in gamma space. In order to combine the color components of the input image 310 in linear space, each color component is raised to the power of gamma, and these values are then combined in a weighted average, for example, using weighting factors for converting component values to a luma value, and the result is then raised to inverse of gamma. This is distinguishable from the standard method of converting color component values to a luma value by virtue of operating in linear space instead of in gamma space as shown in Equation 1, in which the input image is in the RGB color space:

$$Y_{target} = (W_r \times (R_{in})^\gamma + W_g \times (G_{in})^\gamma + W_b \times (B_{in})^\gamma)^{1/\gamma} \quad \text{[EQUATION 1]}$$

where $Y_{target}$ is the quality metric, $W_r$ is a weighting factor for converting $R_{in}$ into a component of a luma value, $R_{in}$ is a red component value from the input image, $W_g$ is a weighting factor for converting $G_{in}$ into a component of a luma value, $G_{in}$ is a green component value from the input image, $W_b$ is a weighting factor for converting $B_{in}$ into a component of a luma value, $B_{in}$ is a blue component value from the input image, and γ is the gamma value associate with the power law used by the format of the input image to represent the component values in gamma space.

The U and V components of the quality metric can be computed by downsampling the color component values of the input image in linear space and then converting these values to YUV format, with the U and V values being taken as the U and V components of the quality metric. In particular, each component value in the image is raised to the power of γ. The image is then downsampled, as in a typical conversion to YUV format. For example, to convert to YUV420 format, downsampling is performed by averaging each 2 pixel by 2 pixel block of the image. The result is then raised to the inverse of γ. The linearly downsampled component values, which are still color components in a format such as RGB, are then converted to YUV format, with the U and V values for each pixel being taken as the U and V components of the quality metric.

In operation 430, the input image 310 is converted from its original format to a chroma subsampled format. For example, the input image can be an RGB image and operation 430 can generate a YUV image (e.g. in YUV420 format) by well-known methods in which the Y, U, and V values are each computed as a weighted combination of the R, G, and B component values, with different weightings applied for the calculation of each of Y, U, and V. The output of operation 430 is a chroma subsampled version of the input image 310.

In operation 440, the chroma subsampled version of the input image 310 that was generated at operation 430 is reconstructed, by converting it back to its original format. For example, if the chroma subsampled version of the input image is in YUV420 format, it can be converted back to RGB format according to well-known methods. Reconstruction is performed in the same manner as will eventually be performed during decoding of the final image. In one implementation, this is performed by compressing and then decompressing the chroma subsampled version of the input image 310 that was generated at operation 430 according the encoding process discussed with respect to the encoding system 330 and the decoding system 350. Thus, in addition to converting back to a non-chroma subsampled format such as from YUV420 to RGB, any additional operations that will occur during decoding are also performed, such as filtering/blurring and clipping. The output of operation 440 is a reconstructed version of the input image 310, which is also referred to as a reconstructed image.

In operation 450, an error value is calculated. This includes calculating a second value of the quality metric, which is done in the manner described with respect to operation 420, but with the reconstructed image as the input. The resulting Y, U, and V components for each pixel constitute the second value of the quality metric. The error value is determined based on the first value of the quality metric and the second value of the quality metric. The error value represents a deviation of the second value of the quality metric from the first value of the quality metric. As an example the error value can be, for each of Y, U, and V on a per pixel basis, a difference between the first value of the quality metric and the second value of the quality metric.

In operation 460, a determination is made as to whether a condition is met. The condition in 460 is used to determine whether further optimization of the chroma subsampled representation of the input image 310 is needed. As one example, the condition can be based on the number of iterations of optimization that have been performed, with the condition being met when a certain number of iterations has been performed. As another example, the condition can be based on the error value, such as by determining that the condition is met when no component of the error value exceeds a threshold, or when an aggregate measure based on the components of the error value falls below a threshold.

If the condition is not met at operation 460, the process continues to operation 470, where the chroma subsampled representation of the input image 310 is optimized. Operation 470 includes modifying the chroma subsampled representation of the input image 310 based on the error value calculated at operation 450. The result of the first iteration of operation 470 is a second chroma subsampled representation of the input image 310 that is generated using the chroma subsampled representation of operation 430 as an input. Additional iterations of operation 470 are performed with respect to chroma subsampled representation that was generated at the immediately prior iteration of operation 470.

In one implementation, the chroma subsampled representation of the input image 310 is modified at operation 470 by adding or subtracting the error value from the chroma subsampled representation of the input image, on a per pixel and per component basis. Other methods of modifying the chroma subsampled representation based on the error value can be implemented at operation 470, such as scaling the error value components prior to adding or subtracting the error value from the chroma subsampled representation of the input image 310.

After the chroma subsampled representation of the input image is optimized at operation 470, the process returns to operation 440, and additional iterations of operations 440, 450, 460, and 470 are performed until the condition is met at operation 460. Once the condition is met at operation 460, the current version of the chroma subsampled representation of the input image is taken as the output of the process 400, and the process ends.

In the process 400, certain values are converted from gamma space to linear space and vice-versa. This is a result of operating with color values in a gamma-exponentiated color space such as the RGB color space. It should be understood that conversions from gamma space to linear space and vice-versa are not required if the color values being processed are in a format that is not based on gamma exponentiation, such as the sRGB color space. As will be understood persons of skill in the art, however, numerous other color spaces and models can be utilized with the methods described herein, such as CIECAM02 and L*a*b*, as examples.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 110 and/or receiving station 120 (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 110 and receiving station 120 do not necessarily have to be implemented in the same manner.

The transmitting station 110 and/or the receiving station 120 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Further, all or a portion of implementations of the disclosure herein can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the disclosure. On the contrary, various modifications and equivalent arrangements are expressly contemplated by this disclosure and included within the scope of the appended claims, which is to be accorded the broadest interpretation so as to encompass all such modifications and equivalent structure as is permitted under the law.

What is claimed is:

1. A method, comprising:
   obtaining, at one or more computing devices, an input image;
   determining a first value of a quality metric for the input image;
   generating a first chroma subsampled representation of the input image;
   generating a reconstructed image based on the chroma subsampled representation;
   determining a second value of the quality metric for the reconstructed image;
   determining an error value based on the first value of the quality metric and the second value of the quality metric; and
   generating a second chroma subsampled representation of the input image based in part on the error value.

2. The method of claim 1, wherein the input image is an RGB image, the first chroma subsampled representation is a YUV image, the reconstructed image is an RGB image, and the second chroma subsampled representation is a YUV image.

3. The method of claim 1, wherein generating a second chroma subsampled representation of the input image based in part on the error value includes modifying the first chroma subsampled representation of the input image using the error value.

4. The method of claim 1, wherein generating a second chroma subsampled representation of the input image based in part on the error value includes at least one of adding or subtracting the error value from the first chroma subsampled representation of the input image.

5. The method of claim 1, wherein the error value is a difference of the first value of the quality metric and the second value of the quality metric.

6. The method of claim 1, wherein the input image includes color component values, the first value of the quality metric is based on the color component values of the input image, the reconstructed image includes color component values, and the second value of the quality metric is based on the color component values of the reconstructed image.

7. The method of claim 1, wherein the input image includes color component values, the first value of the quality metric is a linearly averaged luma value based on the color component values of the input image, the reconstructed image includes color component values, and the second value of the quality metric is a linearly averaged luma value based on the color component values of the reconstructed image.

8. An apparatus, comprising:
   a memory; and
   a processor configured to execute instructions stored in the memory to:
      obtain an input image,
      determine a first value of a quality metric for the input image,
      generate a first chroma subsampled representation of the input image,
      generate a reconstructed image based on the chroma subsampled representation,
      determine a second value of the quality metric for the reconstructed image,
      determine an error value based on the first value of the quality metric and the second value of the quality metric, and
      generate a second chroma subsampled representation of the input image based in part on the error value.

9. The apparatus of claim 8, wherein the input image is an RGB image, the first chroma subsampled representation is a YUV image, the reconstructed image is an RGB image, and the second chroma subsampled representation is a YUV image.

10. The apparatus of claim 8, wherein generating a second chroma subsampled representation of the input image based in part on the error value includes modifying the first chroma subsampled representation of the input image using the error value.

11. The apparatus of claim 8, wherein generating a second chroma subsampled representation of the input image based in part on the error value includes at least one of adding or subtracting the error value from the first chroma subsampled representation of the input image.

12. The apparatus of claim 8, wherein the error value is a difference of the first value of the quality metric and the second value of the quality metric.

13. The apparatus of claim 8, wherein the input image includes color component values, the first value of the quality metric is based on the color component values of the input image, the reconstructed image includes color component values, and the second value of the quality metric is based on the color component values of the reconstructed image.

14. The apparatus of claim 8, wherein the input image includes color component values, the first value of the quality metric is a linear average of color component values of the input image, the reconstructed image includes color component values, and the second value of the quality metric is a linear average of the color component values of the reconstructed image.

15. A non-transitory computer-readable storage device including program instructions executable by one or more processors that, when executed, cause the one or more processors to perform operations, the operations comprising:
   obtaining an input image;
   determining a first value of a quality metric for the input image;
   generating a first chroma subsampled representation of the input image;
   generating a reconstructed image based on the chroma subsampled representation;
   determining a second value of the quality metric for the reconstructed image;
   determining an error value based on the first value of the quality metric and the second value of the quality metric; and
   generating a second chroma subsampled representation of the input image based in part on the error value.

16. The non-transitory computer-readable storage device of claim 15, wherein the input image is an RGB image, the first chroma subsampled representation is a YUV image, the reconstructed image is an RGB image, and the second chroma subsampled representation is a YUV image.

17. The non-transitory computer-readable storage device of claim 15, wherein generating a second chroma subsampled representation of the input image based in part on the error value includes modifying the first chroma subsampled representation of the input image using the error value.

18. The non-transitory computer-readable storage device of claim 15, wherein generating a second chroma subsampled representation of the input image based in part on the error value includes at least one of adding or subtracting the error value from the first chroma subsampled representation of the input image.

19. The non-transitory computer-readable storage device of claim 15, wherein the error value is a difference of the first value of the quality metric and the second value of the quality metric.

20. The non-transitory computer-readable storage device of claim 15, wherein the input image includes color component values, the first value of the quality metric is based on the color component values of the input image, the reconstructed image includes color component values, and the second value of the quality metric is based on the color component values of the reconstructed image.

21. The non-transitory computer-readable storage device of claim 15, wherein the input image includes color component values, the first value of the quality metric is a linear average of color component values of the input image, the reconstructed image includes color component values, and the second value of the quality metric is a linear average of the color component values of the reconstructed image.

* * * * *